US005294466A

United States Patent [19]

Baughman

[11] Patent Number: 5,294,466

[45] Date of Patent: Mar. 15, 1994

[54] LEATHER SURROUND FOR DECORATIVE ARTICLE

[76] Inventor: Daniel G. Baughman, Rte. 1, Box 624, Fontana, Wis. 53125

[21] Appl. No.: 929,346

[22] Filed: Aug. 12, 1992

[51] Int. Cl.[5] ........................... B32B 3/06; B32B 3/10

[52] U.S. Cl. ........................................ 428/14; 428/64; 428/68; 428/28; 428/102; 40/323; 40/330; 40/634

[58] Field of Search ...................... 428/64, 68, 102, 28, 428/14; 40/330, 634, 640, 323

[56] References Cited

FOREIGN PATENT DOCUMENTS 3001927 7/1981 Fed. Rep. of Germany ........ 40/330

*Primary Examiner*—Alexander S. Thomas

*Attorney, Agent, or Firm*—Foley & Lardner

[57] ABSTRACT

A leather surround for decorative articles of the type which could be used with key rings or luggage tags, golf bag tags, and the like includes a pair of leather sheets, one of which includes an opening A decorative article, such as a pictorial work or logo, is inserted between the leather sheets so that the portion to be displayed is visible at the opening. Preferably the article is made from a non-ferrous metal, such as pewter. The article includes a flange surrounding at least a portion of its outer boundary adapted to be received between the two sheets of leather In the preferred embodiment, the leather sheets are stitched together around the outside of the article and flange and an adhesive is applied to the rear surface of the article to assist in bonding the article to the leather sheet and maintaining a desired orientation.

9 Claims, 1 Drawing Sheet

LEATHER SURROUND FOR DECORATIVE ARTICLE

BACKGROUND OF THE INVENTION

1. Field of the Invention

The present invention relates generally to the art of leather articles such as leather fobs or tags of the type used with bags, luggage, key rings, and the like. More specifically, the present invention relates to a leather surround for metallic decorative articles. Still more specifically, the present invention relates to a method of manufacturing such an article wherein the decorative article is firmly secured and wherein the resulting products have a high level of aesthetic appeal.

2. Description of the Prior Art

Key fobs, bag tags, briefcase tags, luggage tags and the like have been known for many years and have been prepared in a variety of sizes and shapes and from a variety of different types of material. Some of such devices have included combinations of different materials, such as flat, painted metal sheets adhered to natural or synthetic leather backing by an adhesive.

Because of the flexibility of the leather, there has been a tendency for the metal portion to break loose from the backing, thereby destroying the function of the tag or fob.

It is also highly desirable to create tags and fobs which have aesthetic appeal, especially when they are employed with higher quality luggage and other merchandise. Moreover, it is becoming increasingly common to have consumers personalize such articles and buy products including artistically detailed displays, including relief images. Such images could be pictorial, graphic, corporate logos and/or combinations of the foregoing with information identifying the purchaser As an example of the latter, it is relatively common to have the initials of a purchaser engraved in luggage tags Regardless of the type of materials used, when leather is employed as the main support for the decorative article, typically made from a different material than the leather, it is necessary to employ an adhesive. Such adhesives have a tendency to fail, resulting in reduced aesthetics and potential loss of the decorative article. It would be highly desirable to provide a surround for the decorative article which could be in the form of a leather tag or fob, and in which the article is firmly oriented and wherein the aesthetic appeal is enhanced.

SUMMARY OF THE INVENTION

The present invention features a tag or fob which, in the most preferred embodiment, satisfies the objectives described above and overcomes the disadvantages of the prior art. More specifically, the preferred embodiment of the present invention features a pair of leather sheets or layers, one of which includes an opening through which a decorative article is displayed. The decorative article itself is preferably made from a non-ferrous metal such as tin or zinc alloys, most preferably pewter. The decorative article itself can be prepared using known techniques, such as casting, and includes a flange around at least a portion of its outer perimeter. The flange is relatively thin and is adapted to be received between the two sheets of leather. The leather opening corresponds to the outer periphery of the decorative article. The two sheets of leather are then stitched together around the area defined by the flange, and in the most preferred embodiment, an adhesive is also applied to the back side of the decorative article to assist in retaining it in a fixed orientation.

How the foregoing features are accomplished will be described in the following detailed description of the preferred embodiment, taken generally in connection with the FIGURES. Other ways in which the features are accomplished will become apparent to those skilled in the art after reading the present specification. Such other ways are deemed to fall within the scope of the invention if they fall within the scope of the claims which follow.

BRIEF DESCRIPTION OF THE DRAWINGS

In the various FIGURES, like reference numerals are used to indicate like components.

DETAILED DESCRIPTION OF THE PREFERRED EMBODIMENT

Before proceeding to a description of the FIGURES which illustrate an article constituting a preferred embodiment of the present invention, several general comments should be made about the applicability and scope of the invention. First, while the present invention is illustrated in connection with a key fob attached to a key ring by a leather strap, the invention has wider applicability for use in other applications such as for luggage tags, bag tags (for example, golf bag tags), for brief case or handbag tags and the like. Second, while an oval design is depicted, the shape is not critical to the present invention and the tags could be made in circular, square, rectangular or in irregular form, following the material selection and manufacturing procedures outlined below. Third, the illustrated fob includes a decorative article which extends from the bottom sheet (as will be described later) through an opening in the top sheet and which extends thereabove and includes graphic and design information. It will be clear that almost any type of design could be employed, such as product logos, relief pictorial art, identifying information for the user of the article, such as name and address, and the like.

With regard to the selection of materials, leather is clearly the preferred material for the two sheets which are eventually stitched together, as will be described below. The leather could be natural or synthetic and other materials having properties similar to leather could also be employed.

The decorative portion of the fob in its most preferred embodiment is made from a tin-based alloy, such as pewter, but other non-ferrous metals such as zinc alloys or metals such as zinc, aluminum, brass, silver, gold plate, or gold could be used. Other materials could also be used for the inset without departing from the intended scope of the invention. The decorative material could also be painted, e.g., with enamel Finally, while an adhesive is shown in the preferred embodiment, it is not essential for the invention. When an adhesive is used, hot melt adhesives, epoxy adhesives or other materials having similar bonding properties can be employed.

Figure 1:
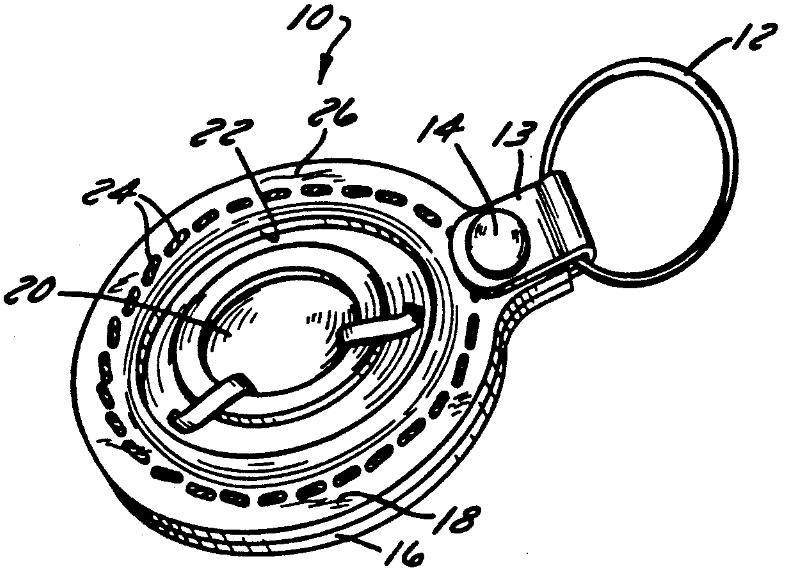
FIG. 1 is a perspective view of a key ring fob prepared according to the most preferred form of the present invention.
Figure 3:
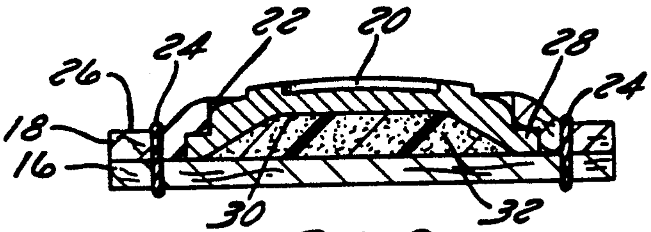
FIG. 3 is a cross-section taken along the line 3—3 of FIG. 1.
Figure 2:
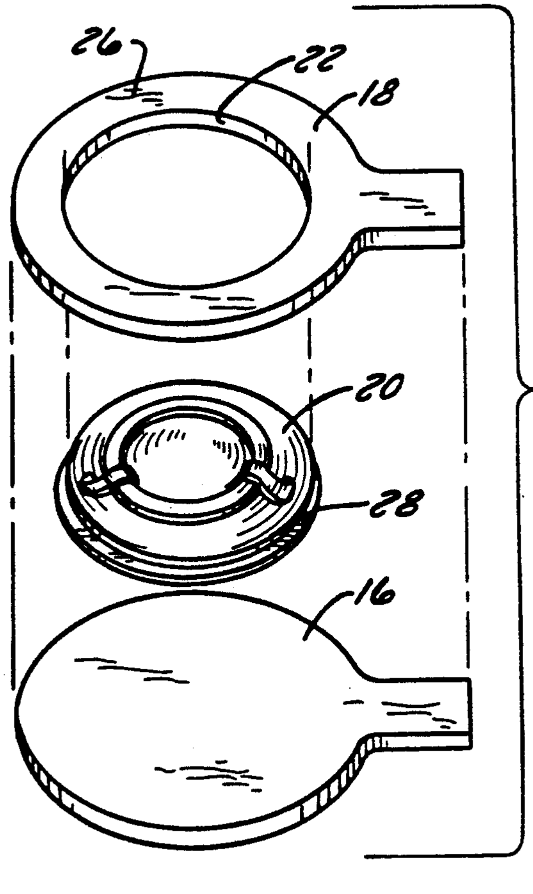
FIG. 2 is a an exploded view of the major components of the fob shown in FIG. 1 and illustrating the upper and lower leather sheets and the intermediate decorative item.

Proceeding now to a description of FIG. 1, which should be viewed in conjunction with FIGS. 2 and 3, a key fob 10 is shown attached to a key ring 12 by a short leather strap 13. The latter is folded over the ring and held to the fob by a brad 14. Fob 10 is comprised of three major components, shown best in FIG. 2, including a lower leather sheet 16, an upper leather sheet 18, and a decorative article 20. Lower sheet 16 is planar, while upper sheet 18 includes an oblong opening 22 which, in FIG. 1, appears to surround the decorative article 20. The fob 10 also includes stitching 24 around the decorative article to hold sheets 16 and 18 against one another. Stitching 24 is located between the outer edge 26 of fob 10 and the opening 22. The precise location for the stitching will become apparent shortly.

Attention should next be directed to FIGS. 2 and 3, where it will be noted that article 20 includes a lip or flange 28 extending around its entire periphery (although periodic breaks in the flange are contemplated). In the most preferred embodiment, the flange 28 is approximately ⅛th-inch wide, but it could be wider. It is not believed that it could be substantially narrower than ⅛th-inch. It should also be noted from FIGS. 2 and 3 that the particular article includes a cavity 30 on its rear surface, a peculiarity for the illustrated article 20. The article could certainly be flat or have a different shaped recess in its rear surface. The cavity permits the article 20 to protrude above the upper surface of sheet 18 as is best shown in FIG. 3. For artistic reasons, it may be desirable to have the upper surface of article 20, i.e., the visible surface, be flush with the upper surface of sheet 18, extend above it, or be recessed below it.

Also visible in FIG. 3 is an adhesive 32 extending across the rear surface of article 20 between that surface and the upper surface of lower sheet 16. As previously mentioned, the adhesive is not necessary but it assists in retaining the orientation of decorative article 20 and its use is preferred.

Referring once again to the stitching 24, it can now be appreciated that the stitching line is outside the area defined by flange 28 and is most preferably quite close thereto, e.g., within ⅛th-inch or so. With this construction, article 20 is held by the adhesive 32 and by the flange 28, even if the leather is flexed or if the leather's firmness deteriorates over time.

The fob of the present invention is made in a manufacturing process which starts with the selection and sizing of sheets 16 and 18. The casting or other decorative article 20 is then adapted to fit into an opening 22, with the flange 28 thereof arranged to be contacted by the upper and lower surfaces of the leather sheets 16 and 18 when the product is fully assembled. The adhesive is then added, followed by stitching to achieve the desired final product.

In addition to the tags and fobs described to this point in the specification, it is also possible to employ the leather surround, flange and stitching process of the present invention to provide a "buckle surround" for belt buckles of the type which include a prong (for insertion to a hole in a belt) and an attachment ring (used to attach the belt to the buckle). The only modifications that would be required to the illustrated device above are to provide cutouts in the lower sheet 16 through which the prong and attachment ring would protrude.

While the present invention has been described in connection with certain FIGURES representing a particularly preferred embodiment, the invention is not to be limited thereby but is to be limited solely by the scope of the claims which follow.

What is claimed is:

1. A decorative article and a surround therefor comprising:

a decorative article having an outer perimeter, a rear surface and a front decorative surface and a single flange extending outwardly from at least a portion of the periphery;

a first sheet larger than the article including the flange and having a first planar opposing surface;

a second sheet larger than the article including the flange, the second sheet including a second planar opposing surface and an opening therethrough corresponding in size to the outer perimeter of the decorative article;

the rear surface of the decorative article being placed on the first opposing surface of the first sheet, the second sheet being placed over the decorative article so that the first and second opposing sheets are adjacent one another and the decorative surface is located in the opening; and stitching securing the first sheet to the second sheet closely adjoining and around the outside of the flange of the decorative article.

2. The invention of claim 1, further including an adhesive between the rear surface and the first sheet.

3. The invention of claim 1, wherein the first and second sheets are selected from the group consisting of natural and synthetic leathers.

4. The invention of claim 3, wherein the first and second sheets are each a natural leather.

5. The invention of claim 1, wherein the decorative article is selected from the group consisting of non-ferrous metals and non-ferrous metal alloys.

6. The invention of claim 1, wherein the decorative article is a pewter casting.

7. The invention of claim 1, wherein at least a portion of the front surface is painted.

8. The invention of claim 1, wherein the flange extends entirely about the outer perimeter of the decorative article and is captured between the first and second sheets.

9. The invention of claim 8, wherein the flange has a width of about ⅛ to ¼ inch.

* * * * *